United States Patent Office 2,768,215
Patented Oct. 23, 1956

2,768,215

PRODUCTION OF ALKYNOLS AND ALKYNEDIOLS

Otto Friedrich Hecht, Easton, Pa., assignor to General Aniline & Film Corporation, New York, N. Y., a corporation of Delaware No Drawing. Application October 31, 1952,
Serial No. 318,083

6 Claims. (Cl. 260—638)

This invention relates to an improved process for the production of alkynols including alkynediols by the reaction of a carbonyl compound selected from the class consisting of aldehydes and ketones with an acetylenic compound to an improved catalyst and method of making the same for use in this process.

In U. S. Patent No. 2,232,867 of Reppe and Keyssner there is disclosed a process for the production of alkynols which consist in causing a carbonyl compound selected from the class consisting of aldehydes and ketones to react in the liquid phase with acetylene hydrocarbons corresponding to the general formula $$R-C \equiv CH$$

wherein R stands for a member of the group consisting of hydrogen and hydrocarbon radicals in the presence of an acetylide of a metal selected from the class consisting of the metals of group Ib of the periodic system and mercury. In large scale operations of this process it has been found that copper acetylide is a preferred catalyst. However, the copper acetylide loses its activity in use and side reactions occur which decrease the yield yield of alkynols.

In United Patent No. 2,300,969 to Reppe et al., there is described an improvement in the above process whereby the activity of copper catalyst is prolonged by incorporating in the catalyst certain substances capable of preventing the formation of cuprene. It has been found that this useful effect lasts longer when the catalyst contains no elementary copper formed by slow decomposition of copper acetylide. By the presence of bismuth, selenium or cerium, the formation of metallic copper from acetylide is slowed down.

I have now found that the alkynol synthesis described in United States Patent No. 2,232,867 including the improvements described in United States Patent No. 2,300,969, may be greatly improved by employing an improved copper catalyst of the type hereinafter described.

The novel copper catalyst which is used in practicing the process of the present invention and which constitutes one feature thereof is readily prepared by heating copper oxide and preferably a substance capable of presenting the formation of cuprene, which is most preferably bismuth oxide, on a siliceous carrier, particularly kaolin, silica gel, fuller's earth, etc. at elevated temperatures and for such a period of time that the formation of copper and bismuth silicates takes place in the surface layer. This is consequently a topochemical reaction and advantageously may be effected by heating a siliceous carrier impregnated with copper oxide and bismuth oxide within the temperature range of 400–800° C. for from 15–100 hours. The thus prepared catalyst is characterized by the fact that, when treated with acetylene at room temperatures, it does not form red copper acetylide. When this catalyst is used in the reaction of carbonyl compounds (aldehydes and ketones) with acetylenic compounds in the processes described in the above U. S. patents, the formation of cuprene is suppressed for substantial periods of time and the activity of the catalyst is greatly prolonged.

The details of this invention will be apparent from consideration of the following specific example. The parts are by weight.

Preparation of catalyst 30 parts of kaolin are soaked with a solution prepared from 16.1 parts $Cu(NO_3)_2.3H_2O$
5.4 parts $Bi(NO_3)_3.5H_2O$
10.0 parts nitric acid (68–70%)
25 parts water The pulp obtained in this manner was extruded through an orifice to form cylindrical bars of approximately 0.3 cm. in diameter and 0.8 cm. in length and then dried for 2 hours at 80° C., 1 hour at 120–150° C., and 1 hour at 180° C., and then heated for 34 hours between 400° C. and 800 C. In this long time a topochemical reaction in the surface layer takes place. It is characteristic of this catalyst that the formation of red copper acetylide has practically disappeared.

The thus obtained granular catalyst was sifted to obtain particles of approximate equivalent size and packed loosely in a stainless steel tubular reactor having a diameter of five inches and a length of ten feet. The preferred size catalyst particles for use in the production of alkynols by the reaction of acetylene with an aldehyde or ketone is to some extent dependent on the cross-sectional area of the reactor.

The preferred sizes of catalyst for different size reactors are indicated in the following table:

| Tube | | Mesh Screen Used to Screen Catalyst Particles (holes in screen per sq. in.) |
|---|---|---|
| Diameter, in. | Length, ft. | |
| 1 | 5 | 6–10 |
| 5 | 10 | 6–8 |
| 10 | 18 | 4–8 |
| 40 | 82 | 3–6 |

Since the present experiment was carried out in a stainless steel tubular reactor having a diameter of five inches and a length of ten feet, the catalyst particles passing through a six-mesh screen and retained on a eight-mesh screen was used in the experiment.

The packed column is flushed with nitrogen and heated to 90° C. A 6% aqueous formaldehyde solution is allowed to trickle for one hour slowly through the warm catalyst by adding the solution through an inlet in the top of the reactor. The catalyst bed is cooled to 70° C. and a stream of nitrogen is passed through the reaction tower. Acetylene is bled slowly into the nitrogen stream and the acetylene content of the influent gas thereby allowed to rise slowly until after two hours a mixture of 70% acetylene—30% nitrogen. The temperature is slowly raised to 120° C. over a period of three hours with continuous passage of the 70% $C_2H_2$—$3ON_2$ gas. At a temperature of 90° C., 18.5% aqueous formaldehyde solution is added countercurrently to the gas flow. During the reaction, the temperature was maintained in the range of 90–105° C. which is the preferred range although reaction will proceed at higher temperatures, such as up to 125° C.

The exhaust gas is chilled to room temperature (gas partially vented and partially recycled) and the condensed alkynol collected. Water is removed from the condensate by distillation until the alkyndiol content of the still pot rises to about 35% alkynediol. The product may be further purified for instance by azeotropic distillation for instance as described in U. S. Patent 2,527,358.

In the foregoing run, 100 percent conversion of the formaldehyde input to alkynols was effected during the first 120 hours. For 600-hour-operation the average conversion was about 80 percent of the formaldehyde input. In a comparative run in the same equipment and under the same operating conditions while using a catalyst prepared in the same manner and having the same copper and bismuth content but heated only five hours at 400–500° C. so that there was no evidence of copper bismuth silicate formation in the surface layer and the catalyst when treated with acetylene at room temperature still formed red copper acetylide was used, there was obtained only 70 percent conversion of the formaldehyde for 82 hours operation and for the following 400 hours, 30–40 percent conversion; on further operation, the catalyst was exhausted by cuprene formation characterized by a strong weight increase of the catalyst up to 500 percent of the original weight.

It will be understood that the foregoing example is illustrative only of the present invention and that various modifications may be made therein without departing from the spirit and scope of the present invention. Thus, while the copper bismuth catalyst employed in the above example is a preferred catalyst, it will be understood that the process is operative when employing the copper catalyst of U. S. Patent 2,232,867 deposited on a siliceous carrier and if such catalysts are heat treated as described herein by heating within the temperature of 400–800° C. for a sufficient period of time for copper silicate to be formed on the surface layer so that the thus treated catalyst does not form red copper acetylide when heated with acetylene at room temperatures, the thus obtained heat treated catalyst is markedly superior to an otherwise identical copper catalyst which has not been so heat treated. As indicated by Patent No. 2,300,969, other substances which prevent the formation of cuprene may be combined with copper on the carrier in place of or along with bismuth and the product obtained by heat treating such catalyst as described herein so that copper silicate is formed in the surface layer and a red copper acetylide is no longer formed when it is treated with acetylene at room temperatures is markedly superior as a catalyst for the present reaction as compared with the same catalyst which has not been so heat treated. In working with the preferred copper-bismuth catalyst described above, it has been found that the relative percentages of copper and bismuth employed in the catalyst are not highly critical. Amounts of bismuth equal to from 25–100 percent of the amount of copper in the catalyst have been employed and found to be satisfactory. As the amount of bismuth increases, some slowing down of the cuprene formation was noted when the catalyst was used. However, such slowing down of cuprene formation is also accompanied by a slight decrease in conversion and it is therefore preferable to employ a catalyst having as low bismuth content as possible.

It will also be apparent that the primary feature of novelty in the present invention is the catalyst employed in the reaction of acetylenic compounds with carbonyl compounds (aldehydes and ketones). The novel catalyst of the present invention is generally useful in the process for preparing alkynols by the reaction of acetylenic compounds with carbonyl compounds described in U. S. Patent No. 2,232,867 and No. 2,300,969. It will be understood that the specific reactions employed (acetylenic compounds and carbonyl compounds) and the (temperature, ratio of reactants, etc.) may be those known in the art, as described in said patents.

I claim:
1. The method of producing catalysts for the production of alkynols by reacting a carbonyl compound with acetylene hydrocarbon which comprises depositing copper oxide on a siliceous carrier and heating the thus impregnated siliceous carrier to a temperature within the range of 400–800° C. for a period of time within the range of 15 to 100 hours, whereby copper silicate is formed in the surface layer and until a sample of the thus heat treated catalyst when treated with acetylene at room temperature does not form red copper acetylide.

2. The catalyst prepared as defined in claim 1.

3. In the process for the production of alkynols which consists in causing a carbonyl compound selected from the class consisting of aldehydes and keytones to react in liquid phase with acetylene hydrocarbons corresponding to the general formula $$R-C\equiv CH$$

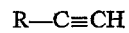

wherein R stands for a member of the group consisting of hydrogen and hydrocarbon radicals in the presence of a catalyst, the improvement which comprises employing as such catalyst a catalyst defined by claim 2.

4. The method of producing catalysts for the production of alkynols by reacting a carbonyl compound with acetylene hydrocarbon which comprises depositing copper oxide and bismuth oxide on a sliceous carrier and heating the thus impregnated siliceous carrier to a temperature within the range of 400–800° C. for a period of time within the range of 15 to 100 hours, whereby copper and bismuth silicates are formed in the surface layer and a sample of the thus heat treated catalyst when treated with acetylene at room temperature does not form red copper acetylide.

5. The catalyst prepared as defined in claim 4.

6. In the process for the production of alkynols which consists in causing a carbonyl compound selected from the class consisting of aldehydes and ketones to react in liquid phase with acetylene hydrocarbons corresponding to the general formula $$R-C\equiv CH$$

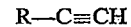

wherein R stands for a member of the group consisting of hydrogen and hydrocarbon radicals in the presence of a catalyst the improvement which comprises employing as such catalyst a catalyst defined by claim 5.

References Cited in the file of this patent

UNITED STATES PATENTS

| | | |
|---|---|---|
| 1,823,865 | Swallen | Sept. 15, 1931 |
| 1,986,557 | Connolly et al. | Jan. 1, 1935 |
| 2,020,411 | Greer | Nov. 12, 1935 |
| 2,191,980 | DeJahn | Feb. 27, 1940 |
| 2,300,969 | Reppe et al. | Nov. 3, 1942 |
| 2,627,527 | Connolly et al. | Feb. 3, 1953 |
| 2,640,756 | Wills | June 2, 1953 |
| 2,670,379 | Hadley et al. | Feb. 23, 1954 |

OTHER REFERENCES

Ser. No. 327,820, Reppe et al. (A. P. C.), published Apr. 29, 1943.

Chemical Abstracts, vol. 37 (1943), 8418, Abstract of Smirnov et al., Khim. Referat. Zhur., No. 14 (1940), pgs. 69–78.